United States Patent
Joo et al.

(10) Patent No.: US 11,028,263 B2
(45) Date of Patent: Jun. 8, 2021

(54) POLYOXYMETHYLENE RESIN COMPOSITION

(71) Applicant: KOREA ENGINEERING PLASTICS CO., LTD., Seoul (KR)

(72) Inventors: Seung Hwan Joo, Seoul (KR); Chang Ho Lee, Incheon (KR); Kwan Yong Choi, Suwon-si (KR)

(73) Assignee: KOREA ENGINEERING PLASTICS CO., LTD., Seoul (KR)

( * ) Notice: Subject to any disclaimer, the term of this patent is extended or adjusted under 35 U.S.C. 154(b) by 0 days.

(21) Appl. No.: 16/342,461

(22) PCT Filed: Oct. 13, 2017

(86) PCT No.: PCT/KR2017/011304
§ 371 (c)(1),
(2) Date: Apr. 16, 2019

(87) PCT Pub. No.: WO2018/074781
PCT Pub. Date: Apr. 26, 2018

(65) Prior Publication Data
US 2020/0048458 A1    Feb. 13, 2020

(30) Foreign Application Priority Data

Oct. 17, 2016  (KR) .......................... 10-2016-0134223

(51) Int. Cl.
| | |
|---|---|
| *C08L 71/02* | (2006.01) |
| *C08K 3/32* | (2006.01) |
| *C08K 5/053* | (2006.01) |
| *C08K 5/21* | (2006.01) |
| *C08J 5/00* | (2006.01) |
| *C08K 5/3492* | (2006.01) |

(52) U.S. Cl.
CPC ............... *C08L 71/02* (2013.01); *C08K 3/32* (2013.01); *C08K 5/053* (2013.01); *C08K 5/21* (2013.01); *C08J 5/00* (2013.01); *C08K 5/34922* (2013.01); *C08K 2003/325* (2013.01)

(58) Field of Classification Search
CPC ........... C08L 71/02; C08K 3/32; C08K 5/053; C08K 5/21
See application file for complete search history.

(56) References Cited

U.S. PATENT DOCUMENTS

| | | |
|---|---|---|
| 3,450,665 A | 6/1969 | Wagner et al. |
| 2010/0324184 A1* | 12/2010 | Sharavanan ............ C08J 7/0427 524/106 |
| 2014/0179865 A1 | 6/2014 | Markgraf et al. |
| 2016/0102190 A1* | 4/2016 | Ito .......................... C08G 2/06 524/247 |

FOREIGN PATENT DOCUMENTS

| | | |
|---|---|---|
| JP | H06345937 A | 12/1994 |
| JP | H06345938 A | 12/1994 |
| JP | H10251481 A | 9/1998 |
| JP | 2004026857 A | 1/2004 |
| JP | 2005171157 A | 6/2005 |
| JP | 2005263921 A | 9/2005 |
| JP | 2014122264 A | 7/2014 |
| KR | 1019880000658 B1 | 4/1988 |
| KR | 1019890013116 A | 9/1989 |
| KR | 20140131675 A | 11/2014 |
| KR | 20160055988 A | 5/2016 |

OTHER PUBLICATIONS

Shi et al. Investigation on thermo-stabilization effect and nonisothermal degradation kinetics of the new compound additives on polyoxymethylene. J Mater Sci (2009) 44:1251-1257 (Year: 2009).*
ISA Korean Intellectual Property Office, International Search Report Issued in Application No. PCT/KR2017/011304, dated Jan. 22, 2018, WIPO, 4 pages.
European Patent Office, Extended European Search Report Issued in Application No. 17862143.9, dated Mar. 30, 2020, Germany, 6 pages.
Japanese Patent Office, Office Action Issued in Application No. 2019-518277, dated Jun. 3, 2020, 8 pages.

* cited by examiner

*Primary Examiner* — John E Uselding
(74) *Attorney, Agent, or Firm* — McCoy Russell LLP

(57) ABSTRACT

A polyoxymethylene resin composition including a polyoxymethylene homopolymer, a polyhydric alcohol, and a calcium phosphate compound, which has excellent thermal stability and a low weight-reduction rate and thus can be favorably used in various industrial fields and used as an engineering plastic in fields of machine parts and the like.

8 Claims, No Drawings

POLYOXYMETHYLENE RESIN COMPOSITION

CROSS-REFERENCE TO RELATED APPLICATIONS

The present application is a U.S. National Phase of International Patent Application Serial No. PCT/KR2017/011304 entitled "POLYOXYMETHYLENE RESIN COMPOSITION," filed on Oct. 13, 2017. International Patent Application Serial No. PCT/KR2017/011304 claims priority to Korean Patent Application No. 10-2016-0134223, filed on Oct. 17, 2016. The entire contents of each of the above-cited applications are hereby incorporated by reference for all purposes.

TECHNICAL FIELD

The present invention relates to a polyoxymethylene resin composition having excellent thermal stability and a low weight-reduction rate to be capable of being favorably used as an engineering plastic in various industrial fields, and in fields of machine parts, and the like.

BACKGROUND ART

Since a polyoxymethylene (POM) resin has excellent mechanical characteristics, creep resistance, fatigue resistance, and friction and wear resistance, POM is widely used in fields satisfying complex requirements, such as various electrical and electronic parts and mechanical mechanisms, and the like.

In general, for the polyoxymethylene resin, an oxymethylene homopolymer or copolymer is prepared by bulk polymerization, solution polymerization, or suspension polymerization of trioxane alone or trioxane with cyclic ether and/or cyclic acetal.

However, the polyoxymethylene resin, particularly the polyoxymethylene homopolymer has insufficient thermal stability, which has a disadvantage that the polyoxymethylene resin is likely to be decomposed thermally, mechanically or by additives during molding. In particular, when an unstable end is present in the resin, an increase in order during molding, poor workability, and the like, are generated. Examples of the decomposition mechanism may include a case where the resin is depolymerized by active energy required for depolymerization supplied from an end in the resin, a case where a main chain is cleaved by mechanical shear external force during molding, and a case where the resin is decomposed by residual impurities in the polyoxymethylene resin, pigments added during processing, or the like, and may further include a decomposition reaction by oxidation.

Thus, various methods have been proposed to improve, thermal stability of the polyoxymethylene homopolymer. For example, there are methods in which additives such as amines, amides, hydrazines, and the like, which are capable of reacting with decomposition gases such as formaldehyde generated by thermal decomposition, are added. However, these methods have limitations in improving thermal stability since the additives are thermally unstable, causing yellowing, resulting in a mold deposit due to bleed out of the additive, and the like.

Another method of improving thermal stability is to stabilize unstable polyoxymethylene molecular ends. In the case of the polyoxymethylene homopolymer, a method of polymerizing formaldehyde, trioxane, or the like in the presence of an anion catalyst and capping the unstable end part using a specific material has been proposed. However, these methods have problems in that the oxymethylene main chain is capable of being easily broken by a mechanism such as solvolysis or the like, and a thermally highly unstable resin is obtained by the presence or absence of an unreacted capping polymer remaining at the end. In order to overcome the disadvantages of the polyoxymethylene homopolymer, a method of randomly dispersing and introducing a copolymer, which is obtained by copolymerizing a specific comonomer, i.e., a cyclic ether such as ethylene oxide or a cyclic formal such as dioxolane with formaldehyde, trioxane, or the like in the presence of a catalyst, into a homopolymer, has been suggested. However, the copolymer prepared by this method should be accompanied by a stabilization process since an end group of the copolymer is very unstable.

A number of studies have suggested a technical solution to solve the above-described problems. Mostly, a method of forcibly decomposing the unstable end site to reach the position of the comonomer is characterized in most inventions. For example, Korean Patent No. 10-0025647 discloses a method of decomposing and stabilizing an end with an aqueous alkaline solution under a non-uniform medium after polymerization, but this method is also unsatisfactory.

DISCLOSURE

Technical Problem

An object of the present invention is to provide a polyoxymethylene resin composition having improved thermal stability of a polyoxymethylene homopolymer and improved mechanical properties and moldability.

Another object of the present invention is to provide a polyoxymethylene resin composition including a polyoxymethylene homopolymer having excellent thermal stability and a low weight-reduction rate.

Technical Solution

The present invention has been made in order to solve the above-described problems, and the present inventors found that a polyoxymethylene homopolymer and specific additives were combined to provide the polyoxymethylene homopolymer having excellent thermal stability and a significantly low weight-reduction rate.

In one general aspect, a polyoxymethylene resin composition includes a polyoxymethylene homopolymer, a polyhydric alcohol containing three or more hydroxy groups in a molecule, and a calcium phosphate compound.

The polyoxymethylene resin composition may further include an ethylene urea.

In another general aspect, there is provided a molded article produced by using the polyoxymethylene resin composition as described above.

Advantageous Effects

The polyoxymethylene resin composition of the present invention has an effect of having improved thermal stability and a low weight-reduction rate of a polyoxymethylene homopolymer, thereby reducing an amount of formaldehyde generated during a molding process.

Further, the polyoxymethylene resin composition of the present invention has excellent processability and mechanical properties while using the polyoxymethylene homopolymer, and thus the polyoxymethylene resin composition may be applied to various fields requiring moldability.

BEST MODE

Hereinafter, the present invention is described in more detail by explaining specific exemplary embodiments or Examples. It should be understood, however, that the following specific exemplary embodiments or Examples are only illustrative of the present invention detail, and the present invention is not limited thereto and may be implemented in various forms.

In addition, unless defined otherwise, all technical and scientific terms used herein have the same meanings as commonly understood by one of those skilled in the art to which the present disclosure pertains. Terms used herein have purposes of effectively describing particular exemplary embodiments only and are not intended to limit the present invention.

In addition, singular forms used in the specification and the appended claims are intended to include plural forms as well, unless otherwise specified in the context.

A first aspect of the present invention relates to a polyoxymethylene resin composition including a polyoxymethylene homopolymer, a polyhydric alcohol containing three or more hydroxy groups in a molecule, and a calcium phosphate compound.

A second aspect of the present invention relates to a polyoxymethylene resin composition including a polyoxymethylene homopolymer, a polyhydric alcohol containing three or more hydroxy groups in a molecule, a calcium phosphate compound, and an ethylene urea.

In the present invention, the first aspect and the second aspect are merely provided to specifically describe the present invention, and thus the present invention is not limited thereto.

Still another aspect of the present invention relates to a molded article produced by using the polyoxymethylene resin composition as described above.

In an embodiment of the polyoxymethylene resin composition of the present invention, 0.001 to 1 part by weight of the polyhydric alcohol and 0.01 to 1 part by weight of the calcium phosphate compound may be included based on 100 parts by weight of the polyoxymethylene homopolymer.

In an embodiment of the polyoxymethylene resin composition of the present invention, 0.1 to 1 part by weight of the ethylene urea may be included based on 100 parts by weight of the polyoxymethylene homopolymer.

In an embodiment of the polyoxymethylene resin composition of the present invention, the polyoxymethylene homopolymer may be obtained by polymerizing a polyoxymethylene-forming monomer in the presence of a polymerization catalyst and then adding a melamine-based polymerization terminator.

In an embodiment of the polyoxymethylene resin composition of the present invention, the melamine-based polymerization terminator may be selected from compounds represented by Chemical Formula 1 below:

[Chemical Formula 1]

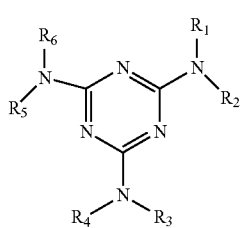

in Chemical Formula 1, $R_1$ to $R_6$ are each independently selected from hydrogen, $C_1$ to $C_6$ alkyl, $C_1$ to $C_6$ alkoxy, and $-CH_2OR_7$, and a case where $R_1$ to $R_6$ are all hydrogen is excluded, $R_7$ is $C_1$ to $C_6$ alkyl or $-R_8CO_2R_9$, $R_8$ is $C_1$ to $C_6$ alkylene, and $R_9$ is $C_1$ to $C_6$ alkyl.

In an embodiment of the polyoxymethylene resin composition of the present invention, the alkyl-substituted melamine may be added in an amount of 0.01 to 50 times the molar amount of the polymerization catalyst used.

In an embodiment of the polyoxymethylene resin composition of the present invention, the polyoxymethylene homopolymer may have a weight average molecular weight of 10,000 to 500,000 g/mol.

In an embodiment of the polyoxymethylene resin composition of the present invention, the polyhydric alcohol may be any one or a mixture of two or more selected from glycerine, trimethylolethane, trimethylolpropane, 2-methyl-1,2,3-propanetriol, 1,2,5-pentanetriol, 1,2,4-butanetriol, hexanetriol, triethanolamine, diglycerin, pentaerythritol, dipentaerythritol, tripentaerythritol, tetraethanol ethylenediamine, methyl glucoside, aromatic diamine-tetraethanol adduct, sorbitol, 2-hydroxymethylpropane-1,3-diol, 2-methyl-1,2,4-butanetriol, 1,3,5-trihydroxymethylbenzene, 1,2,3,6-hexanetetrol, and cyclodextrin.

In an embodiment of the polyoxymethylene resin composition of the present invention, the calcium phosphate compound may be any one or a mixture of two or more selected from hydroxyapatite, tricalcium phosphate, dicalcium phosphate, and calcium phosphate.

In an embodiment of the polyoxymethylene resin composition of the present invention, the ethylene urea may be 2-imidazolidone or imidazolidin-2-one.

In an embodiment of the polyoxymethylene resin composition of the present invention, the polyoxymethylene resin may have a weight-reduction rate of 9% or less and a $CH_2O$ generation amount of 100 ppm or less.

In an embodiment of the polyoxymethylene resin composition of the present invention, the polyoxymethylene resin composition may have a melt index measured at 190° C. and 2.16 kg of 1 to 15 g/10 min, a tensile strength of 67 to 75 MPa, a elongation at yield of 15 to 25%, and an impact strength of 7 to 15 kJ/m².

Hereinafter, each constitution of the present invention is described in more detail.

In the present invention, the polyoxymethylene homopolymer is a polymer prepared by polymerizing a polyoxymethylene-forming monomer in the presence of a polymerization catalyst and then adding a polymerization terminator, which is a homopolymer composed of an oxymethylene unit represented by Chemical Formula 2 below:

$$*{-}CH_2O{-}\!\!\!\!\!\!-\!*$$ [Chemical Formula 2]

The oxymethylene homopolymer may be prepared by polymerizing formaldehyde or a cyclic oligomer thereof, i.e., trioxane.

The polymerization may be performed in the form of bulk polymerization, suspension polymerization, or solution polymerization. A reaction temperature is preferably in the range of 0 to 100° C., and preferably 20 to 80° C., but the reaction temperature is not limited thereto.

Further, at the time of the polymerization reaction of polyoxymethylene, an alkyl-substituted phenol, an ether, or the like, may be used as a chain transferring agent, and an alkyl ether such as dimethoxymethane, or the like, may be preferably used.

The polymerization catalyst may be used without limitation as long as the polymerization catalyst is generally used in the art. For example, Lewis acids, particularly, halides such as boron, tin, titanium, phosphorus, arsenic, antimony, and the like, and more specifically, $BF_3$-based polymerization catalysts such as $BF_3OH_2$, $BF_3O(CH_2CH_3)_2$, $BF_3O$ $(CH_2CH_2CH_2CH_3)_2$, $BF_3CH_3CO_2H$, $BF_3PF_5HF$, $BF_3$-10-hydroxyacetophenol, and the like, may be included. Preferably, $BF_3O(CH_2CH_3)_2$ and $BF_3O(CH_2CH_2CH_2CH_3)_2$ are more preferable to have thermal stability and weight-reduction effect which are objects of the present invention. An amount of the polymerization catalyst to be added is not particularly limited, but is preferably in the range of $2\times10^{-6}$ to $2\times10^{-2}$ mol based on 1 mol of trioxane.

Next, in order to terminate the proceeding polymerization reaction, the polymerization terminator may be added to terminate the polymerization action.

In an embodiment of the present invention, the polymerization terminator may be used without limitation as long as the polymerization terminator is capable of effectively terminating a polymerization reaction. For example, triphenyl phosphate, bis(1,2,2,6,6-pentamethyl-4-piperidyl) sebacate, and a melamine-based polymerization terminator selected from a compound represented by Chemical Formula 1 below, and the like, may be used, and more preferably, the melamine-based polymerization terminator represented by Chemical Formula 1 below may be used in order to improve thermal stability and to further lower the weight-reduction rate.

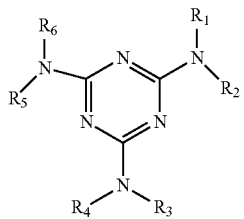

[Chemical Formula 1]

in Chemical Formula 1, $R_1$ to $R_6$ are each independently selected from hydrogen, $C_1$ to $C_6$ alkyl, $C_1$ to $C_6$ alkoxy, and —$CH_2OR_7$, and a case where $R_1$ to $R_6$ are all hydrogen is excluded, $R_7$ is $C_1$ to $C_6$ alkyl or —$R_8CO_2R_9$, $R_8$ is $C_1$ to $C_6$ alkylene, and $R_9$ is $C_1$ to $C_6$ alkyl.

Specific examples of the melamine-based polymerization terminator may include hexamethoxymethyl melamine, hexaethoxymethyl melamine, hexapropoxymethyl melamine, hexabutoxymethylmelamine, and the like.

The polymerization terminator is preferably added in an amount of 0.01 to 50 times, preferably 0.05 to 10 times the molar amount of the polymerization catalyst used, but the added amount of the melamine-based polymerization terminator is not limited thereto. The above-described range is preferable since it is possible to provide excellent thermal stability and to act as a catalyst stably without deterioration of physical properties and discoloration.

Further, the polymerization terminator may be added in the form as it is or may be added in the form that is dissolved in an organic solvent. Here, examples of the organic solvent that is usable may include aromatic hydrocarbons such as benzene, toluene, xylene, and the like, aliphatic hydrocarbons such as n-hexane, n-heptane, cyclohexane, and the like, alcohols such as methanol, and the like, halogenated hydrocarbons such as chloroform, dichloromethane, 1,2-dichloroethane, and the like, and ketones such as acetone, methyl ethyl ketone, and the like.

A weight average molecular weight of the polyoxymethylene homopolymer prepared through the addition of the polymerization terminator is not limited to the present invention, but may be 10,000 to 500,000 g/mol. In addition, a melt index measured at 190° C. and 2.16 kg may be 1 to 15 g/10 min.

In an embodiment of the present invention, the polymerization of the polyoxymethylene homopolymer is not limited to the polymerization method described above, and may include a conventional polymerization method of polymerizing the polyoxymethylene homopolymer.

In an embodiment of the present invention, the polyhydric alcohol is used for further enhancing lubricity and thermal stability, and may include a polyhydric alcohol containing three or more hydroxyl groups in a molecule. More preferably, a polyhydric alcohol having 3 to 8 hydroxyl groups, and the polyhydric alcohol may include an ether bond in the carbon chain. Specific examples of polyhydric alcohol containing three or more hydroxyl groups may include glycerine, trimethylolethane, trimethylolpropane, 2-methyl-1,2,3-propanetriol, 1,2,5-pentanetriol, 1,2,4-butanetriol, hexanetriol, triethanolamine, diglycerin, pentaerythritol, dipentaerythritol, tripentaerythritol, tetraethanol ethylenediamine, methyl glucoside, aromatic diamine-tetraethanol adduct, sorbitol, 2-hydroxymethylpropane-1,3-diol, 2-methyl-1,2,4-butanetriol, 1,3,5-trihydroxymethylbenzene, 1,2,3,6-hexanetetrol, cyclodextrin, and the like, but the polyhydric alcohol is not limited thereto. Further, from the viewpoint of further improving thermal resistance stability and improving miscibility and synergistic effect with a calcium phosphate compound to be added together, dipentaerythritol may be used.

An amount of the polyhydric alcohol may be 0.001 to 1 part by weight, preferably 0.01 to 0.5 parts by weight, based on 100 parts by weight of the polyoxymethylene homopolymer, but the amount of the polyhydric alcohol is not limited thereto. The above-described range is preferable since thermal stability is excellent, and impact resistance and thermal resistance are enhanced.

In an embodiment of the present invention, the calcium phosphate compound is used in combination with the polyhydric alcohol to further improve thermal stability when used and to provide excellent weight-reduction rate. Examples of the calcium phosphate compound may include hydroxyapatite, tricalcium phosphate, dicalcium phosphate, calcium phosphate, and the like, and particularly, hydroxyapatite may be used from the viewpoint of significantly lowering the weight-reduction rate and improving mechanical properties, but the calcium phosphate compound is not limited thereto.

From the viewpoint of further improving a kneading property and achieving uniform dispersion when the calcium phosphate compound is mixed into the composition, the calcium phosphate compound may have an average particle diameter of 0.1 to 10 μm, and more preferably 1 to 5 μm, but the present invention is not limited thereto.

An amount of the calcium phosphate compound may be 0.01 to 1 part by weight, and more preferably 0.01 to 0.5 parts by weight, based on 100 parts by weight of the polyoxymethylene homopolymer. The above-described range is preferable since thermal stability is excellent, and impact resistance and thermal resistance are enhanced.

In an embodiment of the present invention, if necessary, an ethylene urea may be further added together with the polyalcohol and the calcium phosphate compound. By further including the ethylene urea, an amount of formaldehyde emission may be reduced to further improve thermal stability and further improve moldability and mechanical properties. As an example of the ethylene urea, 2-imidazolidone, imidazolidin-2-one, and the like, may be used. The ethylene urea may be used alone or in a mixture of two or more thereof.

The ethylene urea may be prepared by a conventional method by reacting 1,2-ethylenediamine with urea, and may be in the form of flakes, pellets or particles. The amount of the ethylene urea is not limited, but may be 0.001 to 2 parts by weight, specifically 0.01 to 1 part by weight, more specifically 0.1 to 1 part by weight, and more preferably 0.3 to 1 part by weight, based on 100 parts by weight of the polyoxymethylene homopolymer. The above-described range is preferable since thermal stability is further improved, and mechanical strength such as tensile strength, elongation at yield, impact strength, and the like, are improved, but the range of the ethylene urea is not limited thereto.

In an example of the present invention, if necessary, an additive generally used in the field may be further included. Specific examples of the additive may include an antioxidant, formaldehyde or a formic acid removing agent, an end group stabilizer, a filler, a colorant, a lubricant, a release agent, an antistatic agent, a flame retardant, a reinforcing agent, a light stabilizer, and a pigment, and the like. The additive may be used in an amount within a range in which physical properties of the composition of the present invention are not substantially adversely affected.

Specifically, an example of the antioxidant may include sterically hindered bisphenol. For example, tetra-bis[methylene(3,5-di-t-butyl-4-hydrocinnamate)]methane manufactured by Ciba-Geigy under the trade name Irganox 1010, and the like, may be used, but the antioxidant is not limited thereto.

The polyoxymethylene resin composition according to the present invention is a melt-blended blend, all polymer components are well dispersed within each other, and all non-polymeric components are well dispersed and bound by a polymer matrix, and thus the blend forms an integral whole.

The polyoxymethylene resin composition of the present invention may be prepared by blending the components using a conventional mixer such as a Brabender mixer, and then melt-kneading the blend at a temperature higher than a melting point of a polyoxymethylene base resin, for example, 180 to 230° C., preferably 190 to 210° C. using a conventional uniaxial or twin-screw extruder. It is preferable to dry each component before the blending step. The drying may be performed at a temperature of 70 to 110° C. for 2 to 6 hours by using dry air having a dew point of about −30 to −40° C.

The polyoxymethylene resin composition according to the present invention may have a weight-reduction rate of 9% or less and a $CH_2O$ generation amount of 100 ppm or less.

Further, the polyoxymethylene resin composition may satisfy all physical properties in which a melt index measured at 190° C. and 2.16 kg is 1 to 15 g/10 min, a tensile strength is 67 to 75 MPa, a elongation at yield is 15 to 25%, and an impact strength is 7 to 15 $kJ/m^2$. Within the above-described ranges, the polyoxymethylene resin composition has excellent mechanical properties to be suitably usable at the time of manufacturing a molded article, but the present invention is not limited thereto.

The molded article manufactured from the polyoxymethylene resin composition of the present invention may be manufactured by any method known to the person skilled in the art, for example, extrusion, injection molding, compression molding, blow molding, thermal molding, rotary molding, and melt casting. Examples of the molded article may include bearings, gears, cams, rollers, sliding plates, levers, guides, conveyor parts, and the like.

Hereinafter, the present invention is described in detail on the basis of Examples and Comparative Examples. Meanwhile, the following Examples are provided by way of example for explaining the present invention in more detail, and therefore, the present invention is not limited thereto.

The physical properties of the polyoxymethylene resin compositions prepared through Examples and Comparative Examples were measured as follows.

1) Weight-Reduction Rate

The resin composition was treated at a vacuum pressure of 10 mmHg and a temperature of 222±2° C. for 30 minutes, and then the weight-reduction rate was measured to evaluate thermal stability. As the weight-reduction rate value is smaller, the thermal stability is better.

2) Thermal Stability, Formaldehyde Generation Amount

The obtained polyoxymethylene resin composition was molded into a size of 100 mm×40 mm×2 mm, and then fixed and sealed in a 1 L capacity bottle containing 50 ml of water so as not to touch the water. The bottle as prepared above was allowed to stand at 60° C. for 3 hours, and an amount of formaldehyde collected in the water was measured by analyzing the degree of color development using UV spectrophotometer, thereby performing measurement of a formaldehyde generation amount in the molded article. As the formaldehyde generation amount value is smaller, the thermal stability is better.

3) Melt Index

A weight of a resin sample obtained by extrusion from an orifice having a constant inner diameter 190° C. under a load of 2.16 kg for 10 minutes was measured. This value is a measure for evaluating a depolymerization rate of the resin, and as the melt index value is larger, the depolymerization rate is higher.

4) Measurement of Weight Average Molecular Weight

The weight average molecular weight was measured using gel permeation chromatography (GPC) equipment manufactured by Futecs corporation. The equipment is composed of a gradient pump, a column heater (AT-4000), a detector (Shodex 201H R.I Detector), and an injector (NS-6000 automatic injector). The analytical column was HFIP 800 Series manufactured by Shodex, and 7 kinds of polymethyl methacrylate (PMMA) STD were used as standard materials. As a mobile phase solvent, HPLC grade hexafluoroisopropanol (HFIP) was used, and the measurement was performed under conditions where a column heater temperature is 40° C. and a flow rate of the mobile phase solvent is 0.7 ml/min. The polyoxymethylene monomer prepared for sample analysis was dissolved in hexafluoroisopropanol (HFIP), which was a mobile phase solvent, and injected into a GPC machine to measure the weight average molecular weight.

5) Tensile Strength

Tensile strength was measured using a universal testing machine (UTM) according to ISO 527-1 and ISO 527-2 standards. Tensile samples were evaluated 5 times per each sample at a crosshead speed of 50 mm/min to calculate an average value.

6) Elongation at Yield

Elongation at yield was measured using a universal testing machine (UTM) according to ISO 527-1 and ISO 527-2 standards. Tensile samples were evaluated 5 times per each sample at a crosshead speed of 50 mm/min to calculate an average value.

7) Charpy Impact Strength

Charpy impact strength was measured using ISO 179-1 and ISO 179-2 standards. A sample notched at room temperature (25° C.) was used to measure the Charpy impact strength under a 25° C. environment using a Charpy impact tester No. 258D manufactured by YASUDA SEIKI SEISAKUSHO, LTD. The impact strength was evaluated 5 times per each sample to calculate an average value.

Example 1

After a polymerization reactor having a capacity of 1 L was maintained at 50° C., 500 g of trioxane was injected using a metering device, and 0.06 g of $BF_3O(CH_2CH_3)_2$ (70 ppm based on trioxane) was then added as a polymerization catalyst. After 15 minutes from the addition of the polymerization catalyst, hexamethoxymethylmelamine (CYMEL303 manufactured by CYTE Industries Inc.) as a polymerization terminator was added in an amount of 0.170 g which was 1 time the molar amount of the polymerization catalyst used, and dissolved in benzene. After 10 minutes, the reaction was completed, thereby obtaining an homopolyoxymethylene resin. The polymerized homopolyoxymethylene resin had a weight average molecular weight of 200,000 g/mol. The melt index measured at 190° C. and 2.16 kg was 18.7 g/10 min.

Thereafter, the homopolyoxymethylene resin was maintained at 230° C. using a kneader (Labo Plastomill manufactured by TOYOSEIKI Ltd.) having two pairs of Σ-type blades, then 0.05 parts by weight of hydroxyapatite having an average particle diameter of 5 μm and 0.005 part by weight of dipentaerythritol were added with respect to 100 parts by weight of the homopolyoxymethylene resin, and the mixture was allowed to stand for 40 minutes under a nitrogen atmosphere to obtain a polyoxymethylene resin composition.

The physical properties of the polyoxymethylene resin composition were evaluated by the above-described measurement method, and results thereof are shown in Table 1 below.

Examples 2 to 6

Examples 2 to 6 were performed in the same manner as in Example 1, except that when the polyoxymethylene resin composition was prepared, the amounts of hydroxyapatite and dipentaerythritol were changed as shown in Table 1 below.

The physical properties of the polyoxymethylene resin composition were evaluated by the above-described measurement method, and results thereof are shown in Table 1 below.

Examples 7 to 12

A homopolyoxymethylene resin was polymerized in the same manner as in Example 1, except that bis(1,2,2,6,6-pentamethyl-4-piperidyl) sebacate was used as a polymerization terminator at the time of polymerizing the homopolyoxymethylene resin. The polymerized homopolyoxymethylene resin had a weight average molecular weight of 130,000 g/mol. The melt index measured at 190° C. and 2.16 kg was 28 g/10 min.

Using the polymerized homopolyoxymethylene resin, the amounts of hydroxyapatite and dipentaerythritol were changed as shown in Table 2 below when the polyoxymethylene resin composition was prepared. The physical properties of the polyoxymethylene resin composition were evaluated by the above-described measurement method, and results thereof are shown in Table 2 below.

Examples 13 to 18

The homopolyoxymethylene resin was polymerized in the same manner as in Example 1, except that triphenylphosphate was used as the polymerization terminator at the time of polymerizing the homopolyoxymethylene resin. The polymerized homopolyoxymethylene resin had a weight average molecular weight of 110,000 g/mol. The melt index measured at 190° C. and 2.16 kg was 31 g/10 min.

Using the polymerized homopolyoxymethylene resin, the amounts of hydroxyapatite and dipentaerythritol were changed as shown in Table 3 below when the polyoxymethylene resin composition was prepared. The physical properties of the polyoxymethylene resin composition were evaluated by the above-described measurement method, and results thereof are shown in Table 3 below.

Example 19

Example 19 was performed in the same manner as in Example 4, except that 0.3 parts by weight of an ethylene urea (Finecn Chemical Co., Ltd., China) was further added when the polyoxymethylene resin composition was prepared.

The physical properties of the polyoxymethylene resin composition were evaluated by the above-described measurement method, and results thereof are shown in Table 4 below.

Example 20

Example 20 was performed in the same manner as in Example 4, except that 0.5 parts by weight of an ethylene urea (Finecn Chemical Co., Ltd., China) was further added when the polyoxymethylene resin composition was prepared.

The physical properties of the polyoxymethylene resin composition were evaluated by the above-described measurement method, and results thereof are shown in Table 4 below.

Example 21

Example 21 was performed in the same manner as in Example 4, except that 1.0 part by weight of an ethylene urea (Finecn Chemical Co., Ltd., China) was further added when the polyoxymethylene resin composition was prepared.

The physical properties of the polyoxymethylene resin composition were evaluated by the above-described measurement method, and results thereof are shown in Table 4 below.

Comparative Example 1

The physical properties of the homopolyoxymethylene resin polymerized in Example 1 were measured, and results thereof are shown in Table 1 below.

Comparative Examples 2 to 7

In Comparative Examples 2 to 7, the polyoxymethylene resin compositions were prepared by using the same homopolyoxymethylene resin polymerized in Example 1 in the same manner as in Example 1, except that dipentaerythritol was not used, and the amount of hydroxyapatite was changed as shown in Table 1 below. The physical properties of the polyoxymethylene resin composition were evaluated by the above-described measurement method, and results thereof are shown in Table 1 below.

Comparative Example 8

The physical properties of the homopolyoxymethylene resin polymerized in Example 7 were measured, and results thereof are shown in Table 2 below.

Comparative Examples 9 to 14

In Comparative Examples 9 to 14, the polyoxymethylene resin compositions were prepared by using the same homopolyoxymethylene resin polymerized in Example 7 in the same manner as in Example 7, except that dipentaerythritol was not used, and the amount of hydroxyapatite was changed as shown in Table 2 below. The physical properties of the polyoxymethylene resin composition were evaluated by the above-described measurement method, and results thereof are shown in Table 2 below.

Comparative Example 15

The physical properties of the homopolyoxymethylene resin polymerized in Example 13 were measured, and results thereof are shown in Table 3 below.

Comparative Examples 16 to 21

In Comparative Examples 16 to 21, the polyoxymethylene resin compositions were prepared by using the same homopolyoxymethylene resin polymerized in Example 13 in the same manner as in Example 13, except that dipentaerythritol was not used, and the amount of hydroxyapatite was changed as shown in Table 3 below. The physical properties of the polyoxymethylene resin composition were evaluated by the above-described measurement method, and results thereof are shown in Table 3 below.

Comparative Example 22

The polyoxymethylene resin composition was prepared in the same manner as in Example 1, except that dipentaerythritol and hydroxyapatite were not used, and an ethylene urea was used alone as shown in Table 4 below. The physical properties were evaluated by the above-described measurement method, and results thereof are shown in Table 4 below.

Comparative Example 23

The polyoxymethylene resin composition was prepared in the same manner as in Example 19, except that dipentaerythritol was not used, and hydroxyapatite and an ethylene urea were used only as shown in Table 4 below. The physical properties were evaluated by the above-described measurement method, and results thereof are shown in Table 4 below.

In Tables 1 to 4 below, STP 1 is triphenyl phosphate, STP 2 is bis(1,2,2,6,6-pentamethyl-4-piperidyl) sebacate, and STP 3 is hexa methoxy methyl melamine (product: CYMEL 303).

TPS is hydroxyapatite, DIP is dipentaerythritol, and EU is ethylene urea.

TABLE 1

| | Polymerization terminator | | | | | Weight-reduction rate (%) | Thermal stability | Melt index | Tensile strength | Elongation at yield | Impact strength |
|---|---|---|---|---|---|---|---|---|---|---|---|
| | STP1 | STP2 | STP3 | TPS | DIP | | | | | | |
| Example 1 | — | — | o | 0.05 | 0.005 | 9 | 95 | 10.2 | 67 | 14 | 7 |
| Example 2 | — | — | o | 0.05 | 0.01 | 8 | 89 | 9.4 | 67 | 14 | 7.5 |
| Example 3 | — | — | o | 0.05 | 0.05 | 6 | 54 | 6.7 | 68 | 16 | 9 |
| Example 4 | — | — | o | 0.05 | 0.1 | 4 | 20 | 2.6 | 70 | 20 | 12 |
| Example 5 | — | — | o | 0.05 | 0.2 | 4 | 18 | 2.6 | 70 | 20 | 12 |
| Example 6 | — | — | o | 0.05 | 0.3 | 3.5 | 18 | 2.6 | 70 | 20 | 12 |
| Comparative Example 1 | — | — | o | 0 | 0 | 20 | 200 | 18.7 | 65 | 11 | 5 |
| Comparative Example 2 | — | — | o | 0.005 | 0 | 20 | 198 | 18.3 | 65 | 11 | 5 |
| Comparative Example 3 | — | — | o | 0.01 | 0 | 18 | 195 | 18.1 | 65 | 11 | 5 |
| Comparative Example 4 | — | — | o | 0.03 | 0 | 15 | 167 | 16.3 | 66 | 11 | 5 |
| Comparative Example 5 | — | — | o | 0.05 | 0 | 10 | 109 | 11.5 | 67 | 13 | 7 |
| Comparative Example 6 | — | — | o | 0.1 | 0 | 10 | 105 | 10.2 | 67 | 14 | 7 |
| Comparative Example 7 | — | — | o | 0.2 | 0 | 9.5 | 101 | 10.1 | 67 | 14 | 7 |

As shown in Table 1, it was confirmed that when comparing Comparative Example 1 and Examples 1 to 6 showing the physical properties of the homopolymer polymerized in Example 1, the weight-reduction rate was remarkably lowered and the formaldehyde generation amount was lowered by mixing TPS and DIP. In addition, it was confirmed that the mechanical properties such as tensile strength, elongation at yield, impact strength, and the like, were improved.

TABLE 2

| | Polymerization terminator | | | | | Weight-reduction rate | Thermal | Melt | Tensile | Elongation at | Impact |
|---|---|---|---|---|---|---|---|---|---|---|---|
| | STP1 | STP2 | STP3 | TPS | DIP | (%) | stability | index | strength | yield | strength |
| Example 7 | — | o | — | 0.05 | 0.005 | 37 | 143 | 27 | 63 | 10 | 5 |
| Example 8 | — | o | — | 0.05 | 0.01 | 37 | 134 | 27 | 63 | 10 | 5 |
| Example 9 | — | o | — | 0.05 | 0.05 | 36 | 130 | 27 | 63 | 10 | 5 |
| Example 10 | — | o | — | 0.05 | 0.1 | 35 | 129 | 27 | 63 | 11 | 5 |
| Example 11 | — | o | — | 0.05 | 0.2 | 35 | 128 | 27 | 63 | 11 | 5 |
| Example 12 | — | o | — | 0.05 | 0.3 | 35 | 121 | 27 | 63 | 11 | 6 |
| Comparative Example 8 | — | o | — | 0 | 0 | 40 | 300 | 28 | 63 | 9 | 4 |
| Comparative Example 9 | — | o | — | 0.005 | 0 | 40 | 297 | 28 | 63 | 9 | 4 |
| Comparative Example 10 | — | o | — | 0.01 | 0 | 40 | 293 | 27 | 63 | 9 | 4 |
| Comparative Example 11 | — | o | — | 0.03 | 0 | 40 | 251 | 27 | 63 | 9 | 4 |
| Comparative Example 12 | — | o | — | 0.05 | 0 | 37 | 164 | 27 | 63 | 9 | 4 |
| Comparative Example 13 | — | o | — | 0.1 | 0 | 35 | 158 | 27 | 63 | 9 | 4 |
| Comparative Example 14 | — | o | — | 0.2 | 0 | 35 | 152 | 27 | 63 | 9 | 5 |

As shown in Table 2, it was confirmed that when comparing Comparative Example 8 and Examples 7 to 12 showing the physical properties of the homopolymer polymerized in Example 7, the weight-reduction rate was remarkably lowered and the formaldehyde generation amount was lowered by mixing TPS and DIP. In addition, it was confirmed that the mechanical properties such as tensile strength, elongation at yield, impact strength, and the like, were improved.

TABLE 3

| | Polymerization terminator | | | | | Weight-reduction rate | Thermal | Melt | Tensile | Elongation at | Impact |
|---|---|---|---|---|---|---|---|---|---|---|---|
| | STP1 | STP2 | STP3 | TPS | DIP | (%) | stability | index | strength | yield | strength |
| Example 13 | o | — | — | 0.05 | 0.005 | 43 | 171 | 27 | 62 | 9 | 4 |
| Example 14 | o | — | — | 0.05 | 0.01 | 43 | 160 | 27 | 62 | 9 | 4 |
| Example 15 | o | — | — | 0.05 | 0.05 | 42 | 156 | 26 | 62 | 9 | 4 |
| Example 16 | o | — | — | 0.05 | 0.1 | 41 | 155 | 26 | 62 | 9 | 5 |
| Example 17 | o | — | — | 0.05 | 0.2 | 41 | 154 | 26 | 62 | 9 | 5 |
| Example 18 | o | — | — | 0.05 | 0.3 | 40 | 145 | 26 | 62 | 9 | 5 |
| Comparative Example 15 | o | — | — | 0 | 0 | 45 | 360 | 31 | 62 | 8 | 4 |

TABLE 3-continued

| | Polymerization terminator | | | | | Weight-reduction rate | Thermal | Melt | Tensile | Elongation at | Impact |
| --- | --- | --- | --- | --- | --- | --- | --- | --- | --- | --- | --- |
| | STP1 | STP2 | STP3 | TPS | DIP | (%) | stability | index | strength | yield | strength |
| Comparative Example 16 | o | — | — | 0.005 | 0 | 45 | 356 | 31 | 62 | 8 | 4 |
| Comparative Example 17 | o | — | — | 0.01 | 0 | 45 | 351 | 31 | 62 | 8 | 4 |
| Comparative Example 18 | o | — | — | 0.03 | 0 | 45 | 301 | 30 | 62 | 8 | 4 |
| Comparative Example 19 | o | — | — | 0.05 | 0 | 43 | 196 | 27 | 62 | 8 | 4 |
| Comparative Example 20 | o | — | — | 0.1 | 0 | 43 | 189 | 27 | 62 | 8 | 4 |
| Comparative Example 21 | o | — | — | 0.2 | 0 | 42 | 182 | 27 | 62 | 8 | 4 |

As shown in Table 3, it was confirmed that when comparing Comparative Example 15 and Examples 13 to 18 showing the physical properties of the homopolymer polymerized in Example 13, the weight-reduction rate was remarkably lowered and the formaldehyde generation amount was lowered by mixing TPS and DIP. In addition, it was confirmed that the mechanical properties such as tensile strength, elongation at yield, impact strength, and the like, were improved.

TABLE 4

| | Polymerization terminator | | | | | | Weight-reduction rate | Thermal | Melt | Tensile | Elongation at | Impact |
| --- | --- | --- | --- | --- | --- | --- | --- | --- | --- | --- | --- | --- |
| | STP1 | STP2 | STP3 | TPS | DIP | EU | (%) | stability | index | strength | yield | strength |
| Example 19 | — | — | o | 0.05 | 0.1 | 0.3 | 4 | 14 | 2.6 | 70 | 20 | 12 |
| Example 20 | — | — | o | 0.05 | 0.1 | 0.5 | 3 | 10 | 2.5 | 72 | 23 | 13 |
| Example 21 | — | — | o | 0.05 | 0.1 | 1 | 2 | 8 | 2.5 | 75 | 25 | 15 |
| Comparative Example 22 | — | — | o | 0 | 0 | 0.3 | 18 | 187 | 16.3 | 66 | 11 | 5 |
| Comparative Example 23 | — | — | o | 0.05 | 0 | 0.3 | 9 | 81 | 9.7 | 68 | 14 | 8 |

As shown in Table 4, it was confirmed that when an ethylene urea was mixed to be used, the formaldehyde generation amount was significantly lowered as compared to that of Example 4.

Further, it could be appreciated that tensile, strength, elongation at yield, and impact strength increased as the mount of the ethylene urea increased.

The invention claimed is:

1. A polyoxymethylene resin composition comprising:
    a polyoxymethylene homopolymer, a polyhydric alcohol containing three or more hydroxy groups in a molecule in an amount of 0.001 to 1 part by weight based on 100 parts by weight of the polyoxymethylene homopolymer;
    a calcium phosphate compound in an amount of 0.01 to 1 part by weight based on 100 parts by weight of the polyoxymethylene homopolymer; and
    an ethylene urea in an amount of 0.001 to 1 part by weight based on 100 parts by weight of the polyoxymethylene homopolymer;
    wherein the polyoxymethylene homopolymer is obtained by polymerizing formaldehyde or trioxane in the presence of a polymerization catalyst and then adding a melamine-based polymerization terminator,
    wherein the polyoxymethylene resin composition has a weight-reduction rate of 9% or less and a $CH_2O$ generation amount of 100 ppm or less.

2. The polyoxymethylene resin composition of claim 1, wherein the melamine-based polymerization terminator is selected from compounds represented by Chemical Formula 1 below:

[Chemical Formula 1]

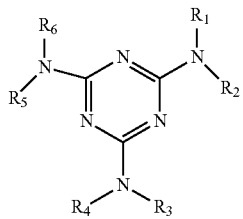

in Chemical Formula 1, $R_1$ to $R_6$ are each independently selected from hydrogen, $C_1$ to $C_6$ alkyl, $C_1$ to $C_6$ alkoxy, and —$CH_2OR_7$, and a case where $R_1$ to $R_6$ are all hydrogen is excluded, $R_7$ is $C_1$ to $C_6$ alkyl or —$R_8CO_2R_9$, $R_8$ is $C_1$ to $C_6$ alkylene, and $R_9$ is $C_1$ to $C_6$ alkyl.

3. The polyoxymethylene resin composition of claim 1, wherein the melamine-based polymerization terminator is added in an amount of 0.01 to 50 times the molar amount of the polymerization catalyst used.

4. The polyoxymethylene resin composition of claim 1, wherein the polyoxymethylene homopolymer has a weight average molecular weight of 10,000 to 500,000 g/mol.

5. The polyoxymethylene resin composition of claim 1, wherein the polyhydric alcohol is any one or a mixture of two or more selected from glycerin, trimethylolethane, trimethylolpropane, 2-methyl-1,2,3-propanetriol, 1,2,5-pentanetriol, 1,2,4-butanetriol, hexanetriol, triethanolamine, diglycerin, pentaerythritol, dipentaerythritol, tripentaerythritol, tetraethanol ethylenediamine, methyl glucoside, aromatic diamine-tetraethanol adduct, sorbitol, 2-hydroxymethylpropane-1,3-diol, 2-methyl-1,2,4-butanetriol, 1,3,5-trihydroxymethylbenzene, 1,2,3,6-hexanetetrol, and cyclodextrin.

6. The polyoxymethylene resin composition of claim 1, wherein the calcium phosphate compound is any one or a mixture of two or more selected from hydroxyapatite, tricalcium phosphate, dicalcium phosphate, and calcium phosphate.

7. The polyoxymethylene resin composition of claim 1, wherein the ethylene urea is 2-imidazolidone or imidazolidin-2-one.

8. The polyoxymethylene resin composition of claim 1, wherein the polyoxymethylene resin composition has a melt index of 1 to 15 g/10 min measured at 190° C. and 2.16 kg, a tensile strength of 67 to 75 MPa, a elongation at yield of 15 to 25%, and an impact strength of 7 to 15 kJ/m².

* * * * *